United States Patent
Wang et al.

(10) Patent No.: US 8,139,622 B2
(45) Date of Patent: Mar. 20, 2012

(54) SYSTEM AND METHOD FOR GENERATING AND DETECTING THE IDENTIFIER SEQUENCE OF THE BANDWIDTH-LIMITED TRANSMITTER

(75) Inventors: Junwei Wang, Beijing (CN); Qihong Ge, Beijing (CN); Tao Tao, Beijing (CN); Dong Bai, Beijing (CN); Wen Chen, Beijing (CN); Qinghua Yang, Beijing (CN); Qun Li, Beijing (CN)

(73) Assignee: TIMI Technologies Co., Ltd., Beijing (CN)

( * ) Notice: Subject to any disclaimer, the term of this patent is extended or adjusted under 35 U.S.C. 154(b) by 0 days.

(21) Appl. No.: 12/446,076

(22) PCT Filed: Nov. 16, 2006

(86) PCT No.: PCT/CN2006/003084
§ 371 (c)(1),
(2), (4) Date: Nov. 10, 2010

(87) PCT Pub. No.: WO2008/049284
PCT Pub. Date: May 2, 2008

(65) Prior Publication Data
US 2011/0044390 A1 Feb. 24, 2011

(30) Foreign Application Priority Data

Oct. 20, 2006 (CN) .......................... 2006 1 0113908

(51) Int. Cl.
*H04B 1/00* (2006.01)
(52) U.S. Cl. .................. 375/142; 375/150; 375/260
(58) Field of Classification Search .............. 375/141, 375/142, 146, 147, 150, 260, 343; 348/473, 348/723
See application file for complete search history.

(56) References Cited

U.S. PATENT DOCUMENTS

| | | | | |
|---|---|---|---|---|
| 5,956,629 A | * | 9/1999 | Morrison | 455/166.2 |
| 7,202,914 B2 | * | 4/2007 | Wu et al. | 348/723 |
| 7,406,104 B2 | * | 7/2008 | Yang et al. | 370/509 |

FOREIGN PATENT DOCUMENTS

| | | |
|---|---|---|
| CN | 1459937 | 12/2003 |
| CN | 1463147 | 12/2003 |
| CN | 1466291 | 1/2004 |
| WO | WO 2005/086446 | 9/2005 |

\* cited by examiner

*Primary Examiner* — David B. Lugo
(74) *Attorney, Agent, or Firm* — Morgan, Lewis & Bockius LLP

(57) ABSTRACT

A system and method for generating and detecting identifier sequence of a bandwidth-limited transmitter are disclosed, comprising an identifier sequence generating portion and a detection portion. The identifier sequence generating portion comprises: generating a frequency-domain random sequence; generating a frequency-domain orthogonal sequence; performing frequency-domain truncation; performing frequency-time transformation; and performing cycle extension. The identifier sequence receiving portion comprises: truncating the time-domain for the received signal; performing time-frequency domain transformation to obtain a frequency-domain signal; generating frequency-domain random sequence; generating a frequency-domain orthogonal sequence; correlating the frequency-domain orthogonal sequence with the frequency-domain signal descrambled by the frequency-domain random sequence; and detecting an output from a frequency-domain correlator by a threshold detecting device and determining the transmitter identifier sequence. The random sequence bandwidth generated by the system and the method of the present invention can be configured flexibly according to transmission bandwidth requirement, and the sequence may be arbitrarily allocated at the power of each frequency point inside the bandwidth. The present invention may be widely applied to multimedia broadcasting, terrestrial radio broadcasting, cable broadcasting and the like.

3 Claims, 3 Drawing Sheets

| Transmitter ID | synchronous signal 1 | synchronous signal 2 |

SYSTEM AND METHOD FOR GENERATING AND DETECTING THE IDENTIFIER SEQUENCE OF THE BANDWIDTH-LIMITED TRANSMITTER

TECHNICAL FIELD

The present invention relates to digital information transmission technology, and more particularly, to generation and detection of bandwidth-limited identifier sequence in an OFDM digital broadcast system.

BACKGROUND

Besides broad coverage and large program capacity, the most excellent characteristic of digital broadcast is its broadcast capability which can be point-to-points and point-to-face, and the cost of broadcasting information is not related to quantity of users. Thus, as an important component of information communication industry, the digital broadcast plays an important role in the construction of national information infrastructure and realization of normal service and national information security strategy.

In digital broadcasting service, the entire country is normally divided into districts, which also can be divided into multi-levels, each district can be configured with a plurality of broadcasting signal transmitters. To facilitate the receiving end obtaining the source of the received signal, the transmitter has to be identified in the transmitting signals. And these identified signals are generally represented in form of pseudo-random sequences. Further, to facilitate detecting the identifier signals of the transmitter by the receiver, it is preferable that these identifier signals have orthogonal properties.

In an OFDM system, a sampling rate is normally higher than a bandwidth of the system, for example, a bandwidth of 8 MHz with a sampling rate of 10 MHz. However, generally, a random sequence generating device generates a random sequence on the time-domain directly. For example, after a m-sequence generator generates a m-sequence x(n), a time-domain random sequence is generated by BPSK mapping. When the sampling rate is 10 MHz, the bandwidth of the sequence is at least 10 MHz, which may exceed the limit of the system bandwidth.

SUMMARY OF INVENTION

As described above, in a digital broadcasting system based on OFDM, a novel method for generating random sequences is needed.

Therefore, the present invention provides a system for generating and detecting an identifier sequence of a bandwidth-limited transmitter, comprising an identifier sequence generating portion and an identifier sequence detecting portion.

The identifier sequence generating portion comprises: a frequency-domain random sequence generating device for generating a frequency-domain random sequence; a frequency-domain orthogonal sequence generating device for generating a frequency-domain orthogonal sequence; a frequency-domain truncating device for frequency-domain truncating the frequency-domain orthogonal sequence scrambled by the frequency-domain random sequence; a frequency-time transforming device for performing frequency-time domain transformation of the truncated frequency-domain sequence; and a periodic extending device for performing periodic extension of the signal transformed into time-domain.

The identifier sequence receiving portion comprises: a time-domain truncating device for performing time-domain truncating of the received signal to obtain a time-domain signal carrying transmitter identifying information; a time-frequency domain transforming device for performing time-frequency domain transformation of the truncated time-domain signal to obtain frequency-domain signal; a frequency-domain random sequence generating device for generating a frequency-domain random sequence; a frequency-domain orthogonal sequence generating device for generating a frequency-domain orthogonal sequence; a frequency-domain correlator for correlating the frequency-domain orthogonal sequence with the frequency-domain signal de-scrambled by the frequency-domain random sequence; and a threshold detecting device for detecting output of the frequency-domain correlator and determining the transmitter to which the identifier sequence belongs.

The present invention also provides another method of generating and detecting an identifier sequence of a bandwidth-limited transmitter, comprising a method of generating the identifier sequence and a method of detecting the identifier sequence.

The method of generating the identifier sequence comprises: generating a frequency-domain random sequence by a frequency-domain random sequence generating device; generating a frequency-domain orthogonal sequence by a frequency-domain orthogonal sequence generating device; performing frequency-domain truncation to the frequency-domain orthogonal sequence scrambled by the frequency-domain random sequence with a frequency-domain truncating device; performing frequency-time domain transformation to the truncated frequency-domain sequence with a frequency-time transforming device; and performing periodic extension to the time-domain signal with a periodic extending device.

The identifier sequence receiving portion comprises: performing time-domain truncation to the received signal with a time-domain truncating device; performing time-frequency domain transformation to the truncated time-domain signal with a time-frequency domain transforming device to obtain a frequency-domain signal; generating a frequency-domain random sequence with the frequency-domain random sequence generating device; generating frequency-domain orthogonal sequence with the frequency-domain orthogonal sequence generating device; correlating the frequency-domain orthogonal sequence with the frequency-domain signal de-scrambled by the frequency-domain random sequence with a frequency-domain correlator; and detecting the output of the frequency-domain correlator with a threshold detecting device and determining the transmitter identifier sequence.

The present invention was realized by time-frequency transformation and scrambling and de-scrambling of the orthogonal sequence, including following features:

The bandwidth of the random sequence is equal or less than the system bandwidth, which may be flexibly configured based on transmission bandwidth;

The power of the sequence in each frequency point of the band can be arbitrarily allocated;

The orthogonality and pseudo-randomness of the transmitter identifier sequence can be insured which may facilitate the detection of the receiver; and The identifier sequence generated by the present invention can be flexibly applied to situations of multi-level divided districts.

The present invention can be widely applied to multimedia broadcasting, terrestrial radio broadcasting, cable broadcasting and the like.

BRIEF DESCRIPTION OF DRAWINGS

The present invention is described but not limited in conjunction with the embodiments shown in the drawings throughout which the similar reference signs represent the similar elements, in which.

DETAILED DESCRIPTION OF EMBODIMENTS

The preferred embodiments of the present invention will be described in detail with reference to accompanying figures.

Figure 1:
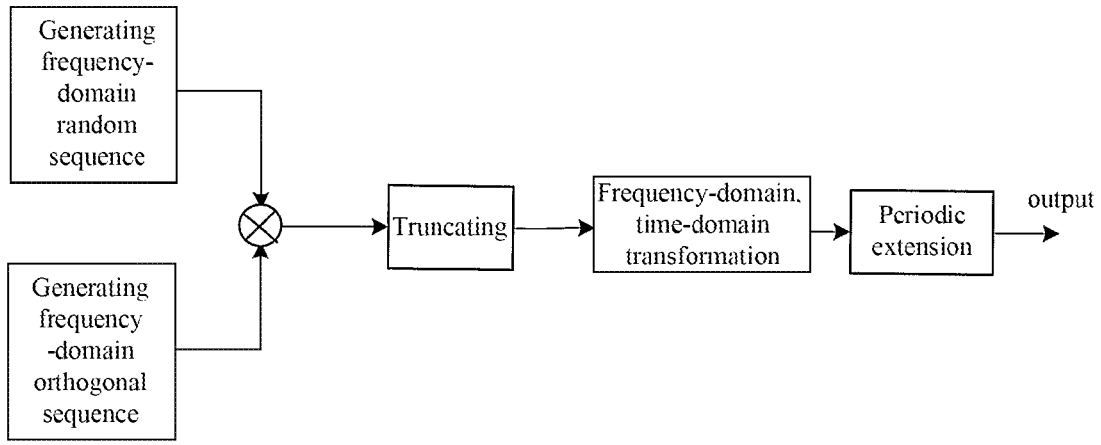
FIG. 1 shows a flow chart of generating a bandwidth-limited transmitter identifier signal according to some embodiments of the present invention.

FIG. 1 shows a flow chart of generating a bandwidth-limited transmitter identifier signal according to some embodiments of the present invention. As shown in the figure, the process includes five parts, i.e., generating frequency-domain random sequence, generating frequency-domain orthogonal sequence, frequency-domain truncating, frequency-time domain transforming and time-domain periodic extension.

The frequency-domain random sequence generator generates a frequency-domain complex random sequence at the receiving end:

$$X(n)=A(n) \cdot m(n), 0 \leq n \leq N-1$$

The frequency-domain orthogonal sequence generator generates a frequency-domain complex orthogonal sequence:

$$W(n), 0 \leq n \leq N-1$$

Wherein N is the length of the frequency-domain sequence, m(n) is a random sequence generated in a specific manner based on system bandwidth, A(n) is an amplitude gain of the random sequence at each frequency point, which is selected based on power distribution requirement in the bandwidth. The complex orthogonal sequence may be a Walsh sequence, a Hadamard sequence or an orthogonal sequence generated in other manner. The complex orthogonal sequence is truncated based on system requirement after frequency-domain scrambled by the complex random sequence, and a time-domain transformer transforms the truncated frequency-domain identifier sequence to the time-domain. Further, based on the system requirement, the time-domain sequence generated by frequency-time domain transformation is subjected to periodic extension.

Figure 2:
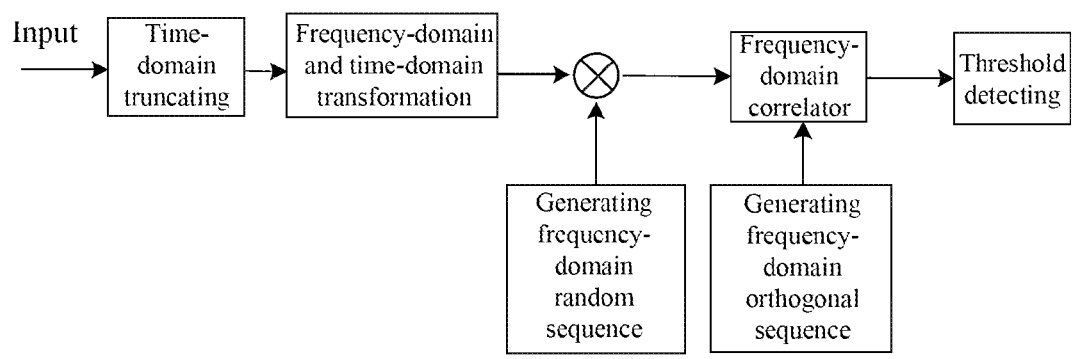
FIG. 2 shows a flow chart of detecting the transmitter identifier signal at the receiving end according to some embodiments of the present invention.

FIG. 2 shows a flow chart of detecting the transmitter identifier signal at the receiving end according to some embodiments of the present invention. As shown in FIG. 2, it comprises time-domain truncating, time-frequency domain transforming, frequency-domain random sequence generating, frequency-domain orthogonal sequence generating, a correlator and threshold detecting.

The receiving end obtains the time-domain identifier sequence of the transmitter by time-domain truncation, and the time-domain identifier sequence is transformed into frequency-domain by time-frequency domain transformation, after frequency-domain de-scrambling and related calculation with the corresponding identifier sequence, and finally, the related result is compared with a threshold to determine the source of the received signal.

Figures 3, 4:
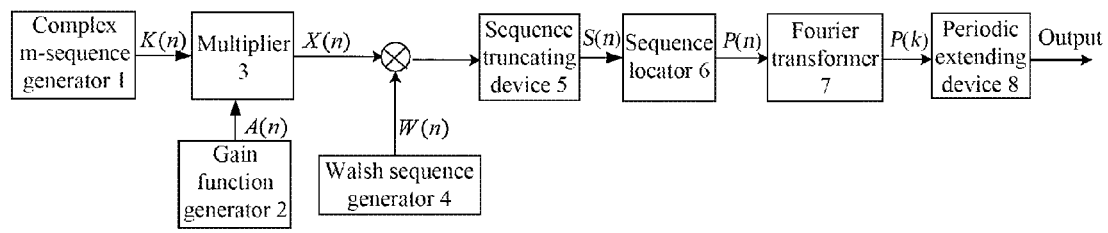
FIG. 3 shows a beacon structure of a multimedia broadcasting system according to some embodiments of the present invention.
FIG. 4 shows a schematic view of a bandwidth-limited random signal generator in the multimedia broadcasting system according to some embodiments of the present invention.

In a multimedia broadcasting system with a sampling rate of 10 MHz and a system bandwidth of 8 MHz, the bandwidth-limited random sequence is functioned as a beacon. FIG. 3 shows a beacon structure of the multimedia broadcasting system according to some embodiment of the present invention. As shown in FIG. 3, the beacon includes a transmitter identifier sequence with 191 points, and the identifier sequence can be periodically extended to 280 points with 256-point IFFT in time-domain.

FIG. 4 shows a schematic view of a bandwidth-limited random signal generator in the multimedia broadcasting system according to some embodiments of the present invention. The frequency-domain truncated sequence is obtained by scrambling the orthogonal sequence with the m-sequence, then the sequence undertakes Fourier transformation to generate a bandwidth-limited random sequence having a bandwidth of 8M without DC component, then it is subjected to periodic extension to obtain the transmitter identifier sequence. More detained description is as follows.

Figure 5:
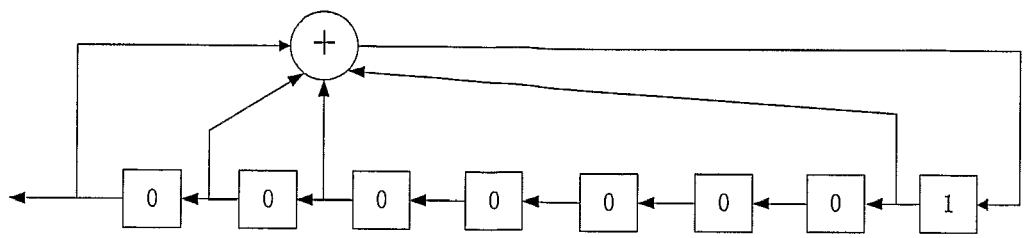
FIG. 5 shows a schematic view of a shift register for generating a complex-m sequence according to some embodiments of the present invention.

In the complex m-sequence generator 1, the m-sequence M(n) is generated by a shift register having a polynomial of $x^8+x^7+x^6+x+1$ where $0 \leq n \leq 254$. The structure of the shift register is shown in FIG. 5, with an initial state of 0000 0001.

Then, the m-sequence is mapped into the complex m-sequence:

$$K(n) = \begin{cases} 1+0j, & M(n) = 0 \\ -1+0j, & M(n) = 1 \end{cases}$$

The complex m-sequence generator may be SSRG structure, MSRG structure or Gold structure.

A gain function generator 2 can generates a gain function based on the signal frequency-domain characteristics of power average distribution in the passband:

$$A(n) = \begin{cases} 1, & 1 \leq n \leq 95 \text{ or } 160 \leq n \leq 255 \\ anyvalue & \text{other range} \end{cases}$$

The positioned m-sequence is multiplied with the gain function by a multiplier 3, and the frequency-domain sequence before transformation is obtained:

$$X(n)=P(n)*A(n), 0 \leq m \leq 255$$

256 Walsh sequences W(n) with lengths of 256 are generated by a Walsh sequence generator 4, and the obtained Walsh sequences are also transformed into a complex frequency-domain sequence W(n):

$$W(n) = \begin{cases} 1+0 \cdot j, & w(n) = 0 \\ -1+0 \cdot j, & w(n) = 1 \end{cases}$$

The output of the multiplier X(n) is multiplied with the Walsh sequence W(n) to obtain a complex symbol sequence having a length of 256. A sequence truncating device 5 extracts the 66$^{th}$ to 256$^{th}$ elements in the complex symbol sequence based on system requirements to obtain a frequency-domain complex random sequence S(n) having a length of 191.

Based on the requirement of a 8M signal bandwidth without DC component, a sequence locator 6 positions the m-sequence at an appropriate place in the frequency domain before domain transformation to obtain a 256-point frequency-domain random sequence:

$$P(n) = \begin{cases} 0, & n = 0 \\ S(n-1), & 1 \leq n \leq 95 \\ 0, & 96 \leq n \leq 159 \\ S(n-65), & 160 \leq n \leq 255 \end{cases}$$

The P(n) is transformed into time-domain by a Fourier transformer 7 to obtain a time-domain random sequence:

$$p(k) = FFT[P(n)] = \frac{1}{16} \sum_{n=0}^{255} P(n) e^{j2\pi nk/256}, 0 \leq k \leq 255$$

Because the system requires the transmitter identifier sequence having 280 points in the time domain whereas the 256-point time-frequency domain transformation is performed herein, the 256-point time-domain sequence is periodic extended to 280 points by a period extending device 8.

Through the above steps, 256 pseudo-random transmitter identifier sequences are obtained. If secondary division is needed, i.e., the whole country has to be divided into 128 districts, each district may have 128 transmitters at maximum. And the 256 transmitter identifier sequences may be arbitrarily divided into two sets, each set containing 128 identifier sequences. The sequences in one set are allocated to 128 different districts, and the sequences in the other set are allocated to the transmitters in each district. The identifier of the district may be transmitted in even time-slots and the identifier of the transmitter itself can be transmitted in odd time-slots, or vice versa.

If it is divided into 4 levels, the whole country is divided into 64 districts, each district is also divided into 64 primary sub-districts, and each primary sub-district is divided into 64 secondary sub-districts, and each secondary sub-districts may have 64 transmitters. And the 256 identifier sequences are divided into 4 sub-sets, each sub-set contains 64 different identifier sequences. The 64 sequences in the first sub-set are allocated to the 64 sub-districts in the uppermost layer, the 64 sequences in the second sub-set are allocated to the 64 primary sub-districts in each district, the 64 sequences in the 3$^{rd}$ sub-set are allocated to 64 secondary sub-districts in each primary sub-district, the 64 sequences in the 4$^{th}$ sub-set are allocated to 64 transmitters in each secondary sub-district. Each level of sub-districts and the identifier sequence of the transmitter can be transmitted in turn in the adjacent 4 time slots.

If divided in other manner, the identifier sequences obtained can be flexibly allocated based on the above method.

To obtain the source of the received signal at the receiving end, it is necessary for the receiver to detect by the transmitter identifier information carried in the receiving signal.

Figure 6:
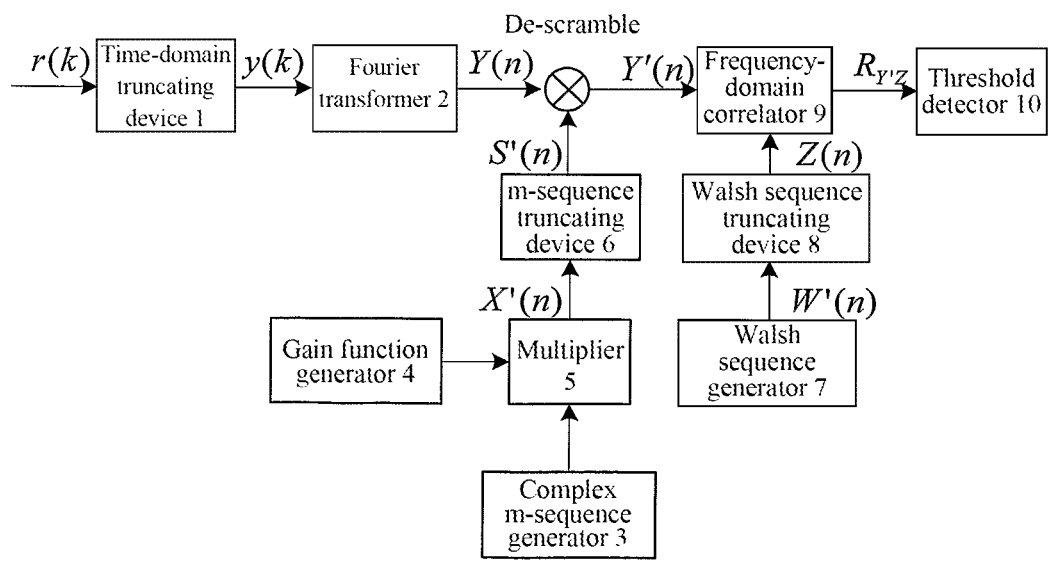
FIG. 6 shows a flow chart for detecting the identifier sequence at the receiving end according some embodiments of to the present invention.

The transmitter identifier sequence detecting device at the receiving signal is shown in FIG. 6, which is described in detail in the following.

The time-domain truncating device 1 truncates data sequence y(k) with a symbol length of 256 in a corresponding position in the received data r(k), 0≦k≦255.

The Fourier transformer 2 transforms the identifier sequence from time-domain to frequency-domain, and obtains the following frequency-domain sequence:

$$Y(n) = FFT[y(k)] = \frac{1}{16} \sum_{k=0}^{255} y(k) e^{-j2\pi nk/256}, 0 \leq n \leq 255$$

The complex m-sequence generator 3, the gain function generator 4 and the multiplier 5 have the same function as the complex m-sequence generator 1, the gain function generator 2 and the multiplier 3 in FIG. 4.

The output of the multiplier is the complex symbol sequence X'(n) with a length of 256. The m-sequence truncating device 6 extracts the 66$^{th}$ to 256$^{th}$ elements of the complex symbol sequence for the length coinciding with the receiving end, thus obtaining a frequency-domain complex random sequence S'(n) having a length of 191 to de-scramble in the frequency-domain.

The Walsh sequence generator 7 has the same function as the Walsh sequence generator 4 in FIG. 4.

The Walsh sequence generator generates a complex symbol sequence W'(n) having a length of 256. The Walsh sequence truncating device 8 extracts the 66$^{th}$ to 256$^{th}$ elements of the complex symbol sequence for the length coinciding with the receiving end, thus obtaining a frequency-domain complex random sequence Z(n) having a length of 191 to de-scramble in the frequency-domain.

The frequency-domain correlator 9 correlates the Y'(n) obtained after de-scrambling with the Walsh sequence Z(n), and obtains:

$$R_{Y'Z}(\tau) = \sum_{n=0}^{190} Y'(n) \cdot Z(n - \tau)$$

Finally, the threshold detector compares the correlating value $R_{Y'Z}(0)$) with a predetermined threshold value Threshold. If $R_{Y'Z}(0) \geq$ Threshold, the Walsh sequence generated by the Walsh sequence generator is an identifier sequence of a certain transmitter at the time, otherwise, not. The threshold value Threshold may be predetermined based on actual system requirement.

Although the present invention is described in conjunction with the examples and embodiments, the present invention is not intended to be limited thereto. On the contrary, the present invention obviously covers the various modifications and may equivalences, which are all enclosed in the scope of the following claims.

What is claimed is:

1. A system for generating and detecting an identifier sequence of a bandwidth-limited transmitter, comprising an identifier sequence generating portion and an identifier sequence detecting portion, wherein, the identifier sequence generating portion comprises:
a frequency-domain random sequence generating device for generating a frequency-domain random sequence;
a frequency-domain orthogonal sequence generating device for generating a frequency-domain orthogonal sequence;

a frequency-domain truncating device for frequency-domain truncating the frequency-domain orthogonal sequence scrambled by the frequency-domain random sequence;
a frequency-time transforming device for performing frequency-time domain transformation of the truncated frequency-domain sequence;
a periodic extending device for performing periodic extension of the signal transformed into time-domain;
the identifier sequence receiving portion comprises:
a time-domain truncating device for performing time-domain truncation of the received signal;
a time-frequency domain transforming device for performing time-frequency domain transformation of the truncated time-domain signal to obtain frequency-domain signal;
a frequency-domain random sequence generating device for generating a frequency-domain random sequence;
a frequency-domain orthogonal sequence generating device for generating a frequency-domain orthogonal sequence;
a frequency-domain correlator for correlating the frequency-domain orthogonal sequence with the frequency-domain signal de-scrambled by the frequency-domain random sequence; and
a threshold detecting device for detecting output of the frequency-domain correlator and determining the transmitter to which the identifier sequence belongs.

2. A method of generating and detecting an identifier sequence of a bandwidth-limited transmitter, comprising a method of generating the identifier sequence and a method of detecting the identifier sequence, wherein
the method of generating the identifier sequence comprises:
generating a frequency-domain random sequence by a frequency-domain random sequence generating device;
generating a frequency-domain orthogonal sequence by a frequency-domain orthogonal sequence generating device;
performing frequency-domain truncation to the frequency-domain orthogonal sequence scrambled by the frequency-domain random sequence with a frequency-domain truncating device;
performing frequency-time domain transformation to the truncated frequency-domain sequence with a frequency-time transforming device to obtain a time-domain signal;
performing periodic extension to the time-domain signal with a periodic extending device;
the method of detecting identifier sequence comprises:
performing time-domain truncation to the received signal with a time-domain truncating device;
performing time-frequency domain transformation to the truncated time-domain signal with a time-frequency domain transforming device to obtain a frequency-domain signal;
generating a frequency-domain random sequence by the frequency-domain random sequence generating device;
generating frequency-domain orthogonal sequence by the frequency-domain orthogonal sequence generating device;
correlating the frequency-domain orthogonal sequence with the frequency-domain signal de-scrambled by the frequency-domain random sequence with a frequency-domain correlator; and
detecting the output of the frequency-domain correlator with a threshold detecting device and determining the transmitter identifier sequence.

3. The method according to claim 2, wherein the frequency-domain random sequence generated by the frequency-domain random sequence generator is $X(n)=A(n) \cdot m(n)$, $0 \leq n \leq N-1$, in which $m(n)$ is a random sequence which is generated based on the system bandwidth, $A(n)$ is an amplitude gain of the random sequence at each frequency point, which is selected based on power distribution in the bandwidth of the system.

* * * * *